Jan. 23, 1934. W. C. STEVENS 1,944,768
METHOD OF BUILDING BEADS FOR TIRES
Original Filed June 13, 1925 7 Sheets-Sheet 1
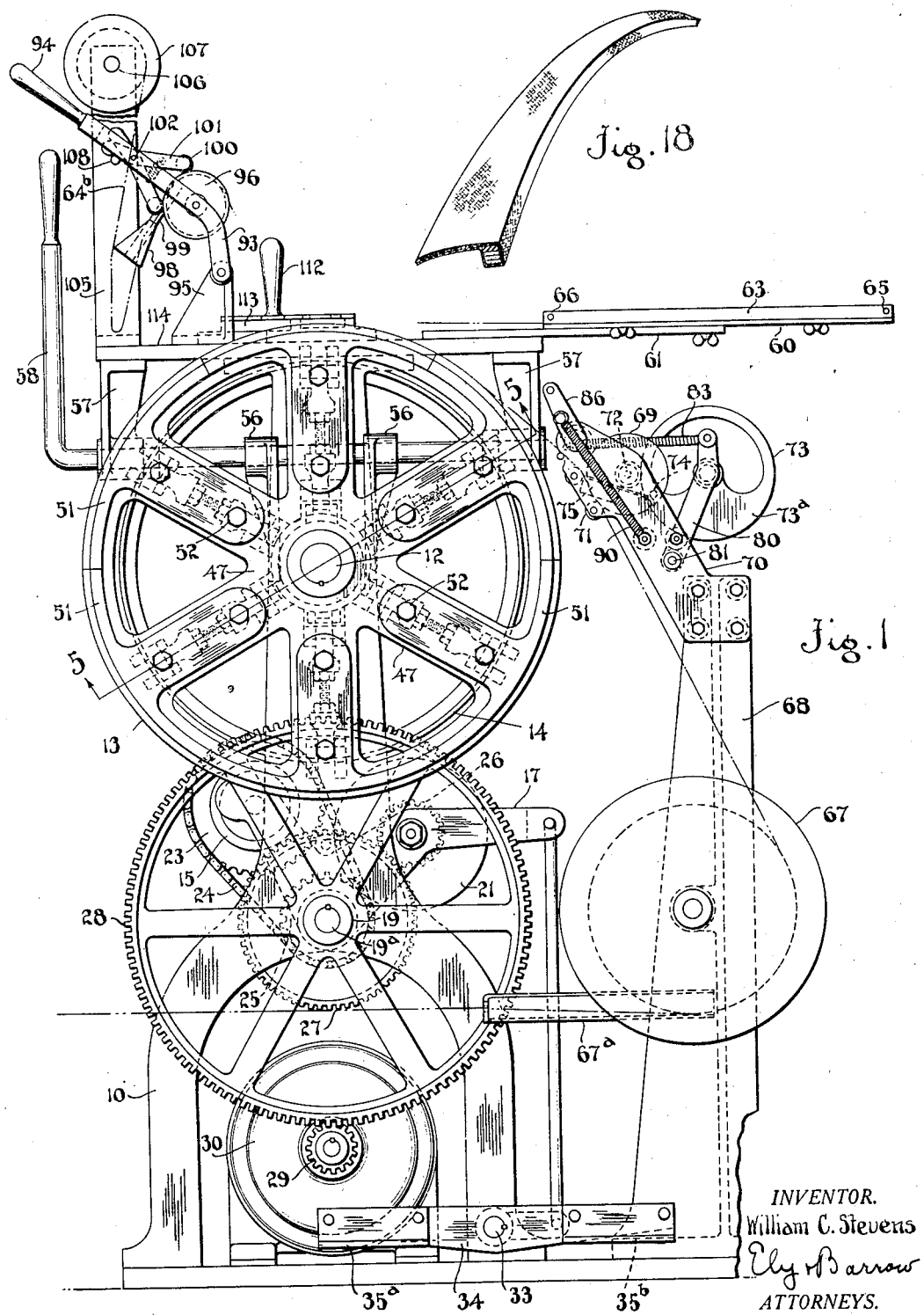
INVENTOR.
William C. Stevens
Ely Barrow
ATTORNEYS.

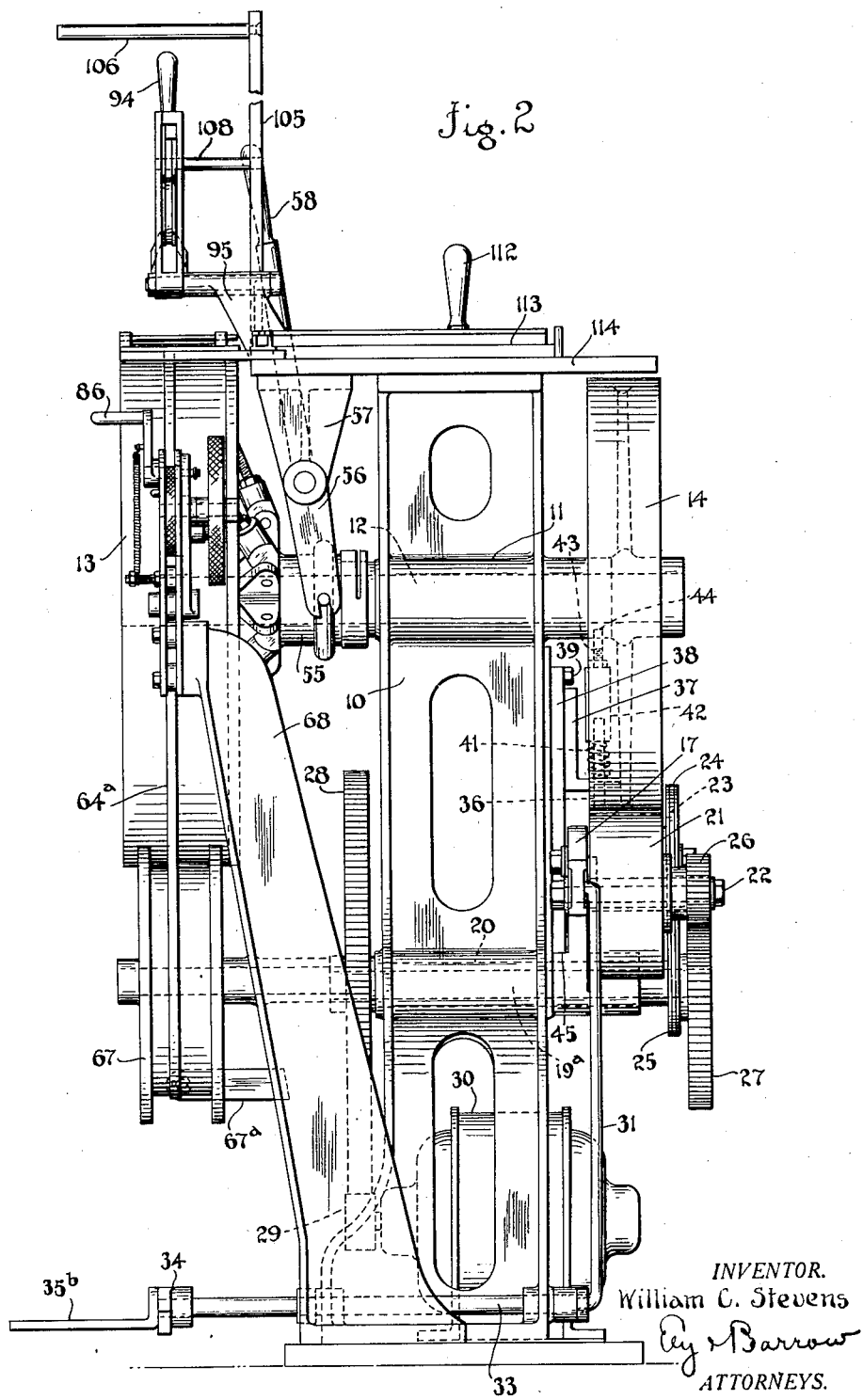

Jan. 23, 1934. W. C. STEVENS 1,944,768
METHOD OF BUILDING BEADS FOR TIRES
Original Filed June 13, 1925 7 Sheets-Sheet 3
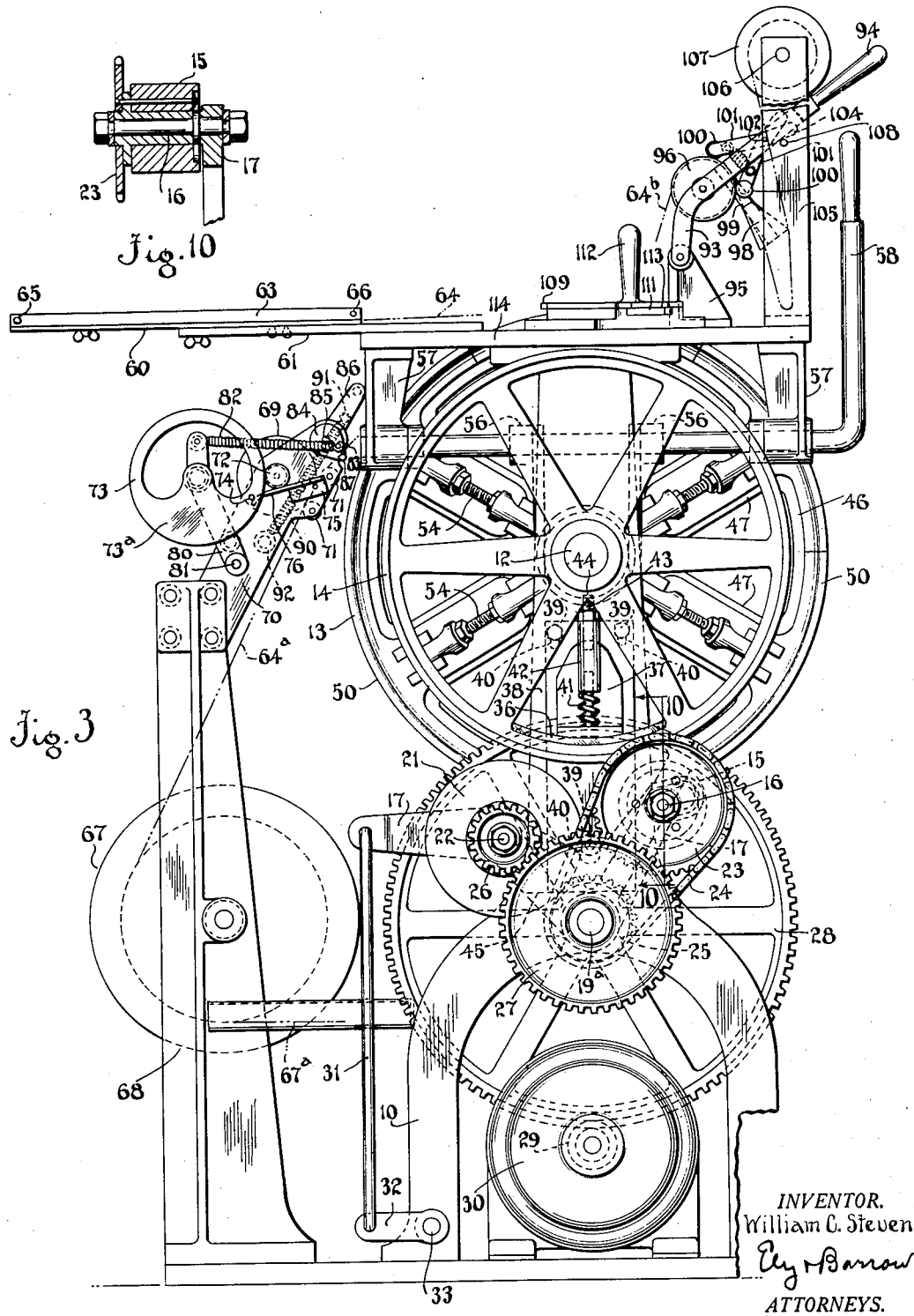
INVENTOR.
William C. Stevens
Ely Barrow
ATTORNEYS.

Jan. 23, 1934.  W. C. STEVENS  1,944,768
METHOD OF BUILDING BEADS FOR TIRES
Original Filed June 13, 1925    7 Sheets-Sheet 4
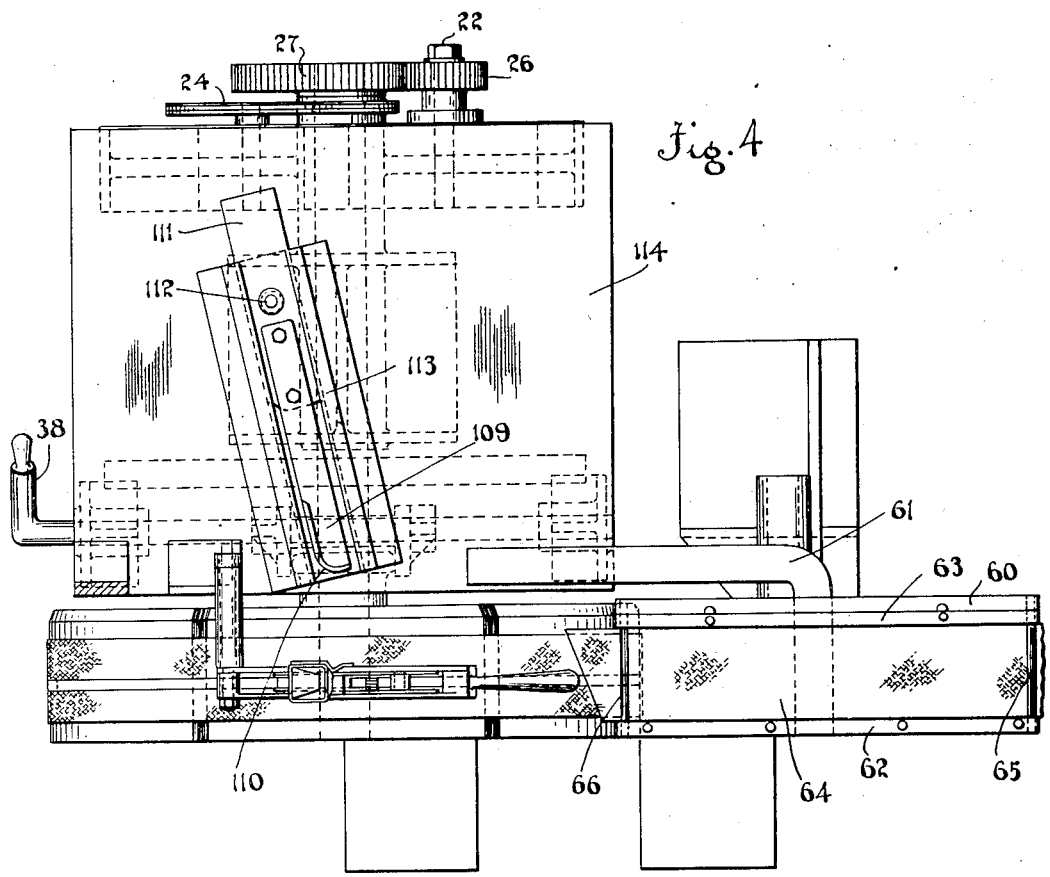
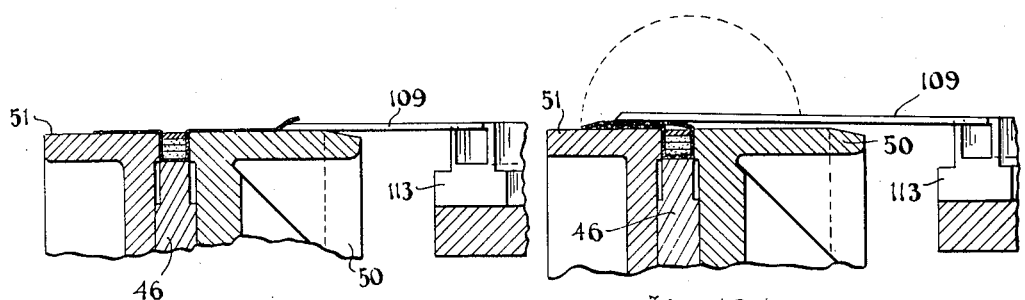
INVENTOR.
William C. Stevens
BY
ATTORNEYS.

Jan. 23, 1934.  W. C. STEVENS  1,944,768
METHOD OF BUILDING BEADS FOR TIRES
Original Filed June 13, 1925    7 Sheets-Sheet 5
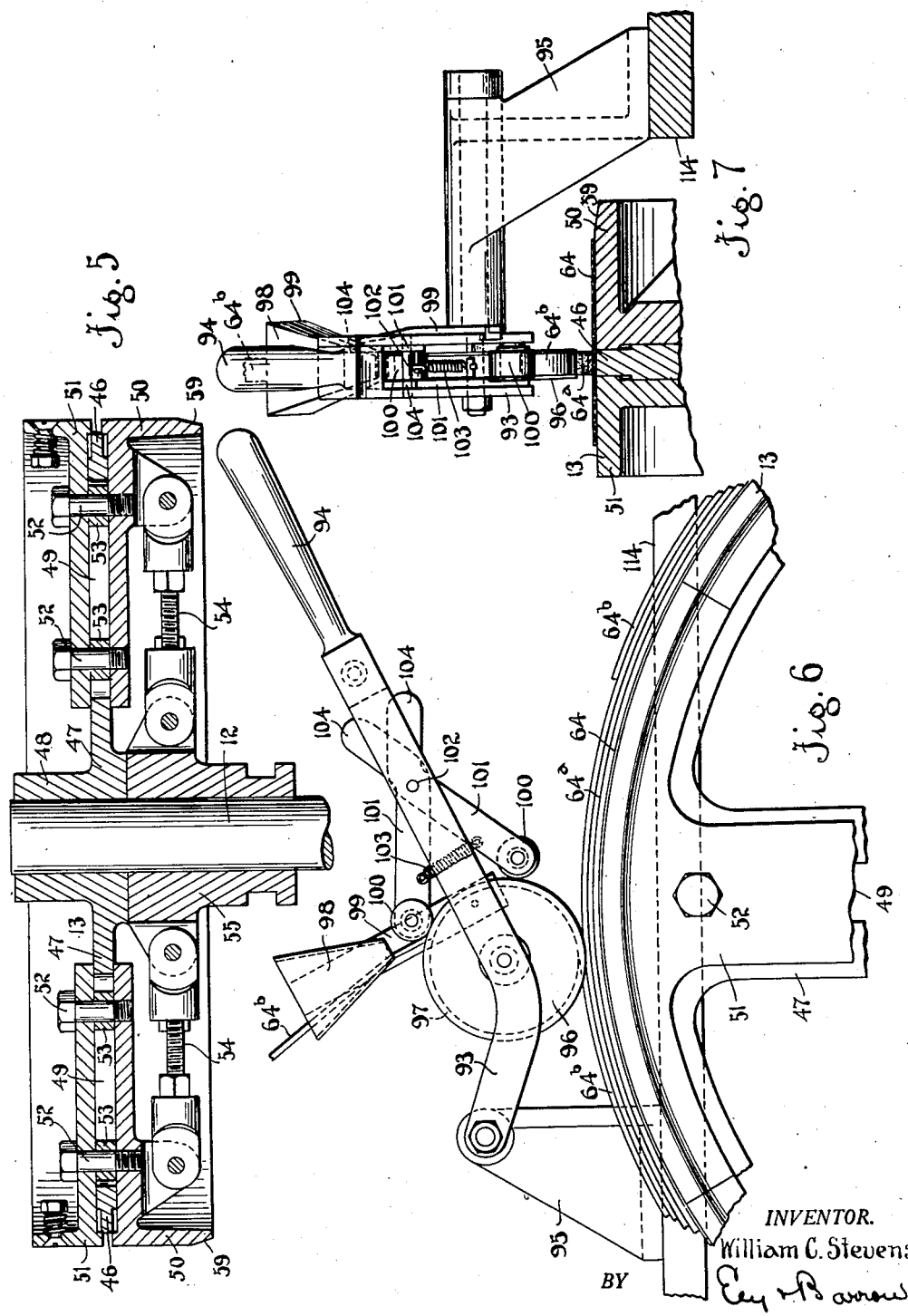
INVENTOR.
William C. Stevens
BY
ATTORNEYS.

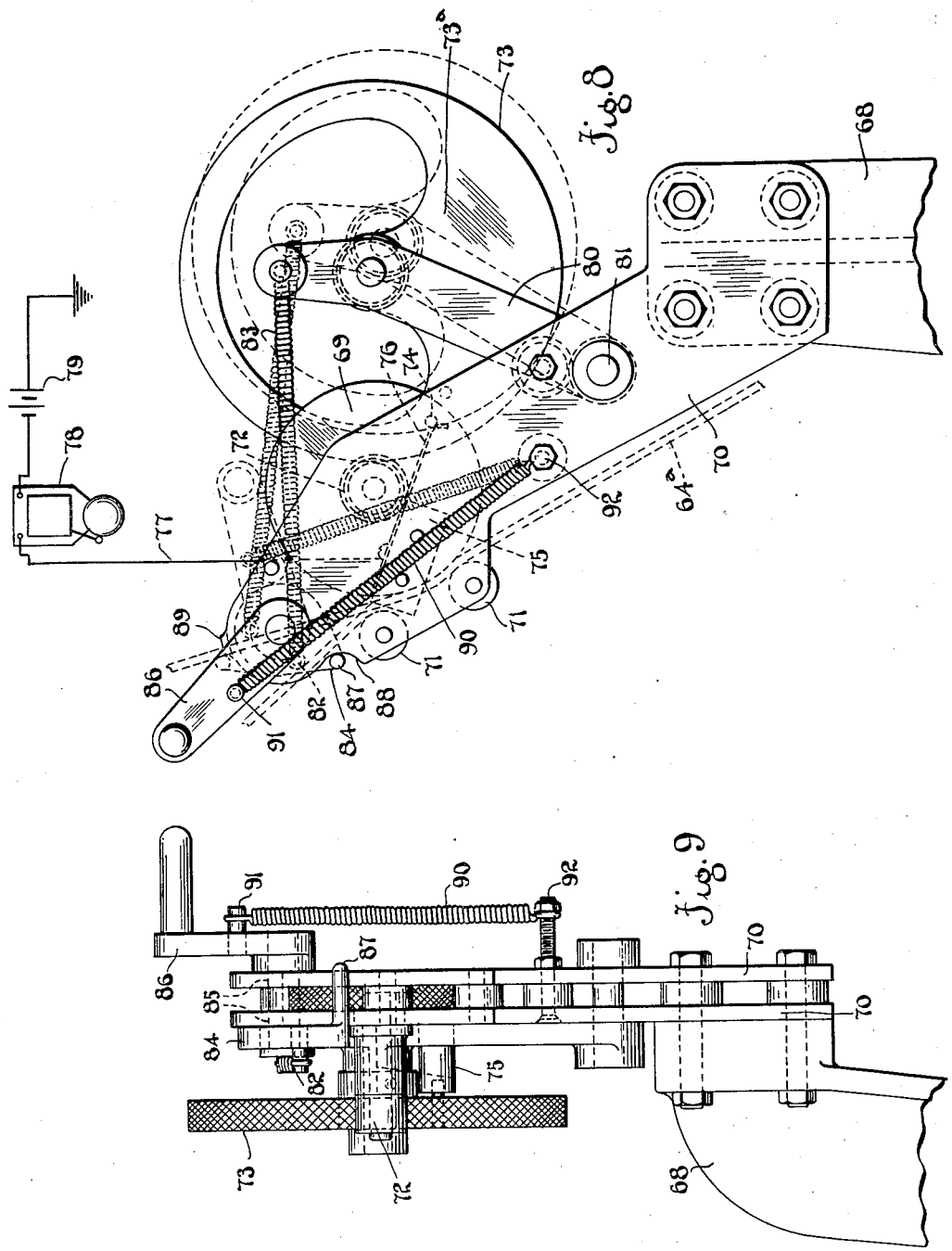

INVENTOR.
William C. Stevens
BY Ely Barrows
ATTORNEYS.

Patented Jan. 23, 1934

1,944,768

UNITED STATES PATENT OFFICE 1,944,768

METHOD OF BUILDING BEADS FOR TIRES

William C. Stevens, Uniontown, Ohio, assignor to The Firestone Tire & Rubber Company, Akron, Ohio, a corporation of Ohio Original application June 13, 1925, Serial No. 36,898, now Patent No. 1,855,426, dated April 26, 1932. Divided and this application May 20, 1931. Serial No. 538,634

4 Claims. (Cl. 154—9)

This invention relates to procedures and apparatus for building beads for use in pneumatic tires and particularly to methods and apparatus for building complete "green" or non-vulcanized beads adapted to be mounted in tires as such and to be cured in the tires.

Important general objects of the invention are to provide an improved procedure for building beads, and an improved apparatus for quickly, effectively and cheaply carrying out the steps of the procedure.

One object of the invention is to provide a novel drum construction on which the beads can be built.

Another object is to provide means for guiding a covering and bead flipper fabric onto said drum.

Another object is to provide means for guiding bead wire onto the fabric on the drum and for counting the number of convolutions wrapped onto said drum.

Another object is to provide a device for guiding and applying a bead filler onto the wire on the drum.

Another object is to provide a drum constructed to turn the bead flipper fabric about the bead wire and filler.

Another object is to provide a spinner or stitcher for forming the "flipper" on said bead by an operation on said fabric.

Another object is to provide improved means for driving said drum in opposite directions and at different speeds.

The foregoing and other objects will be more readily understood as the following description is read in connection with the accompanying drawings, it being understood that the invention is not limited to the specific form thereof shown and described.

Of the accompanying drawings:

Figure 1 is a front elevation of a machine embodying and adapted to carry out the invention;

Figure 2 is a right end elevation thereof;

Figure 3 is a rear elevation thereof;

Figure 4 is a plan thereof;

Figure 5 is a section of the drum on line 5—5 of Figure 1;

Figure 6 is an enlarged front elevation of the filler strip applying device;

Figure 7 is a right end elevation thereof;

Figure 8 is an enlarged front elevation of the wire guiding and convolution counting device;

Figure 9 is a left end elevation thereof;

Figure 10 is a detail section of one of the drum driving friction rollers on line 10—10 of Figure 3;

Figures 11 and 12 are detail sections illustrating the operation of the flipper stitcher on the drum;

Figure 18 is a perspective view illustrating a portion of a completed bead.

Figure 13:
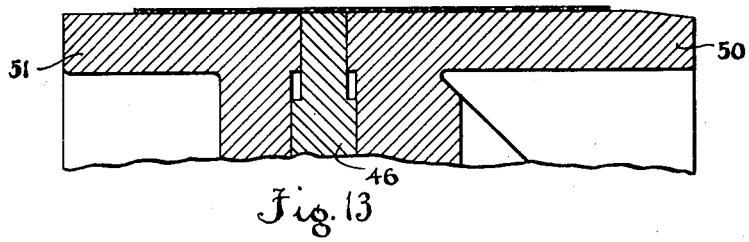
Figures 13 to 17 are detail sections of the drum illustrating progressively the steps of the bead-building process performed thereon.

This application is a division of my co-pending application Serial No. 36,898, filed June 13, 1925, patented April 26, 1932 as Patent No. 1,855,426.

The drum driving instrumentalities

Referring to the drawings, 10 represents a standard having journaled therein at 11 a shaft 12, on one end of which is secured a drum 13 later to be more fully described, and on the other end of which is secured a friction driven pulley 14. Arranged to drive pulley 14 is a friction roller 15 journaled on a spindle 16 carried by a bracket 17 pivoted on a tubular bushing 19 journaled at 20 in standard 10 and also a friction roller 21 journaled on a spindle 22 carried by said bracket. Roller 15 is rotatively secured to a sprocket 23 having trained thereover a chain 24 which is also trained over a drive sprocket 25 secured on shaft 19$^a$ journaled in bushing 19. Roller 21 is rotatively connected to a gear 26 meshed with a gear 27 secured on shaft 19$^a$. Shaft 19$^a$ also has thereon a gear 28 meshed with a gear 29 on the shaft of a motor 30 for driving rollers 15 and 21 in reverse directions and at different speeds.

In order to engage either roller 15 or roller 21 with friction pulley 14, bracket 17 is connected by a link 31 to an arm 32 on a rock shaft 33, adapted to be rocked in one direction or the other to engage one drive roller or the other with pulley 14 by means of a double pedaled lever 34 secured at its center on shaft 33 and having pedal 35$^a$ on one end and a pedal 35$^b$ on the other. A brake 36 is arranged to normally engage the inner surface of friction pulley 14 by being mounted on a bracket 37 secured on a slide 38 slidable on standard 10 on which it is retained by cap-screws 39, 39 engaged through slots 40, 40 in said slide. A spring 41 is effective on brake 36, compression in which spring can be adjusted by a sleeve 42 threadedly received on a rod 43 secured to bearing 11 at 44. To disengage brake 36 from the friction pulley 14 by moving it upwardly when either drive roller 15 or 21 is moved into engagement with the pulley, a cam formation is provided on bracket 17 at 45 and engages the lower end of slide 38.

The drum

Figure 15:
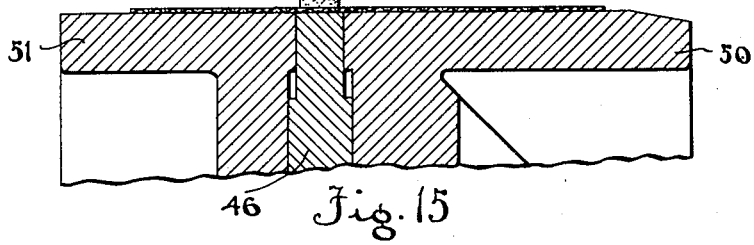

As best shown in Figure 5, the drum 13 includes a fixed central portion 46 formed on spider arms 47, 47 which in turn are formed on a central hub 48 secured on shaft 12. Arms 47 are each slotted as at 49, 49 and slidably mounted on each arm are segments 50 and 51 arranged in pairs on opposite sides of the fixed portion 46 of drum 13. Segments 50 and 51 are secured in pairs to move together as units by means of bolts 52, 52 passing through slots 49 and having anti-friction rollers 53, 53 thereon engaging in the slots 49 to guide movements of the segments. Segments 50 and 51 are so formed that when in collapsed condition they form with portion 46 a substantially smooth comparatively broad flat-surface drum (Figure 13). When expanded as shown in Figure 5, the segments 50 and 51 are adapted to form with portion 46 a drum having a peripheral groove therein. Expanding action of the segments 50 and 51 is provided to perform the operation of turning the covering and flipper fabric about the wire and filler of the bead (Figure 15).

Expansion and contraction of segments 50 and 51 is accomplished by adjustable toggle levers 54, 54 secured to segments 50 and 51 and to a central collar 55 shiftable on shaft 12 by means of a yoke 56 (Figures 1 and 2) pivoted on brackets 57 and operable by a hand lever 58. The outer margins of segments 50 are beveled inwardly as at 59, 59 for a purpose which will later appear.

The covering and flipper fabric guiding device

This device consists in a guide plate 60 mounted on a bracket 61 so as to lie in the plane of revolution of drum 13. The plate 60 has a guide bar 62 secured on one side thereof and a guide bar 63 adjustably secured on the other side thereof between which the covering and flipper fabric indicated at 64 may be properly guided onto drum 13. Rods 65 and 66 are arranged transversely of the ends of plate 60 on guide bars 62 and 63 so that the fabric passing over the guide plate 60 will pass under the rods and will be thus held between the bars.

The wire feeding and convolution counting devices

To feed the bead wire indicated at 64$^a$, which is usually in the form of a flat tape of braided wire which has been rubberized, onto the fabric 64 on drum 13 over the portion 46 of said drum, a roll 67 for guiding the wire from another reel (not shown) is mounted on a standard 68 arranged adjacent standard 10. To guide the wire onto roll 67, a guiding device 67$^a$ is employed. The roll 67 is arranged to rotate in the plane of drum 13. From the roll 67 the wire is guided onto the surface of a drum 69 (Figures 8 and 9) which is so journaled on spaced brackets 70, 70 mounted on standard 68 as to rotate between said brackets, between which the wire is fed, the brackets thus serving as a guide. To hold the wire against drum 69, rollers 71, 71 are provided, each being journaled between brackets 70, 70.

The counting of the convolutions of wire as applied on the drum 13 is accomplished by means of drum 69 which has rotatively secured thereto a friction roller 72 adapted to be engaged by a counter wheel 73. The sizes of roller 72 and wheel 73 are such that the latter will rotate once for each complete revolution of drum 13. On wheel 73 is a contact pin 74 and mounted on an insulating block 75 on one bracket 70 is a contact brush 76 projecting into the path of pin 74 so that a contact will be made for every revolution of wheel 73. Brush 76 is connected by a lead 77 to a bell 78 supported at any suitable place on the frame of the machine and bell 78 is connected to one pole of a battery 79, the other pole thereof being suitably grounded on the machine so that contact of pin 74 with brush 76 will complete a circuit through bell 78 causing it to ring as each complete convolution of wire is applied to drum 13.

Since it is desirable to disengage the counter wheel from the drive roller 72 and to carry pin 74 out of contact with brush 76 to prevent continuous ringing of the bell 78 when the wire feeding device is not in use, wheel 73 is journaled on a bracket 80 pivoted at 81, 81 on brackets 70 and connected by a spring 83 at its free end to a pin 82 eccentrically mounted on an angularly adjustable disk 84 journaled at 85, 85 on brackets 70. A hand crank 86 is arranged to rotate disk 84 and a pin 87 on said disk is arranged to engage stops 88 and 89 formed on brackets 70, whereby movement of disk 84 in either direction will be limited. Pin 87 extends across the space between brackets 70 and accordingly serves to hold the free end of the bead wire back out of the way when the wire feeding and counting device is not in use. Pin 82 is so situated that spring 83 will be effective to hold wheel 73 in contact with drive roller 72 when pin 87 is urged by said spring against stop 88. To assist the action of spring 83 when pin 87 is against stop 88 and also to positively hold wheel 73 out of engagement with roller 72 when the crank 86 is moved to carry pin 87 against stop 89, a spring 90 is connected to a pin 91 on crank 86 and to a cap screw 92 on bracket 70.

Wheel 73 is formed with a weighted portion 73$^a$ as shown so that when disengaged from roller 72 it will be caused by gravity to assume a position with pin 74 adjacent contact brush 76 ready for a counting operation.

The filler strip applying device

The structure of this device (see Figures 6 and 7) includes a lever 93 provided with a handle 94 and pivoted on a bracket 95 so as to carry the device toward or from the drum. On lever 93 is journaled a roller 96 provided with a peripheral groove 97 for receiving the filler strip indicated at 64$^b$. To guide the strip into the groove 97, a funnel 98 is secured on a bracket 99 mounted on lever 93. A pair of pressure rollers 100, 100 are arranged to engage roller 96 to hold the strip in groove 97. Each roller is journaled on a lever 101 having a common pivot 102. A spring 103 connects levers 101 so as normally to urge rollers 100 onto roller 96. Levers 101 are formed with extensions 104, 104 adapted to be manually squeezed together to disengage rollers 100 from roller 96 against the action of spring 103 to permit threading the filler strip through the device. Roller 96 is thus adapted to be swung onto the convolutions of wire on drum 13 as shown in Figure 7. To supply the filler strip to the above device, standard 105 is mounted on standard 10 and has a spindle 106 thereon for the reception of a reel 107 of filler strip. Standard 105 also carries a rest 108 for the filler strip applying device when not in use.

The flipper stitcher

The flipper stitcher comprises a stitcher blade 109 formed with a beveled edge 110 and carried by a slide 111 operable by a handle 112 in a guide 113 secured on a top plate 114 mounted on standard 10. Blade 109 is thus adapted to be urged transversely of drum 13 at a slight angle due to the setting of guide 113 on plate 114. The beveled portions 59 on segments 50 of drum 13 prevent destruction of the blade 109 which is normally adapted to lie against the surface of said drum so as to pass under the flipper fabric in the manner illustrated in Figure 11. Blade 109 is also adapted to spring upwardly to pass over the double thickness of fabric which is formed on drum 13 to provide the "flipper" of the bead.

The method and operation of the apparatus

A strip of bias-cut rubberized fabric of the proper width is first fed onto drum 13 when in flat condition (Figure 13) the fabric being accurately guided thereon by its passage over guide plate 60 between bars 62 and 63 and under rods 65 and 66, roller 15 being employed to drive the drum slowly in a counterclockwise direction (Figure 1) to apply the fabric. When a complete convolution of fabric has been applied, rotation of the drum is stopped and the fabric is cut to the proper length to form a slight lap and is spliced on the drum.

Crank 86 is now operated to carry counter wheel 73 into contact with driving roller 72 and the end of the bead wire which is threaded through the guiding and counting device is placed on the fabric on drum 13, its position on the fabric being over the portion 46 of said drum which the operator can readily judge by feeling the surface of the fabric where it overlies said portion.

Figure 14:
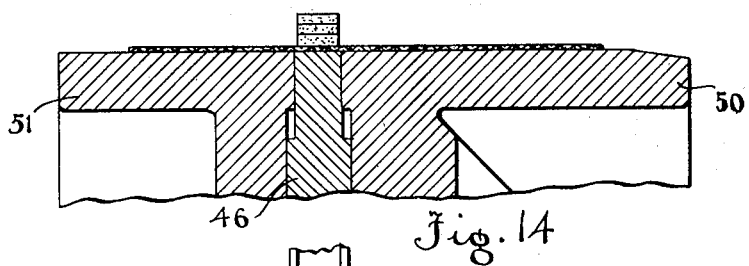

Driving of drum 13 counter-clockwise slowly is again effected and the wire is wrapped onto the drum 13 one convolution on the other, the bell 78 ringing each time a convolution is applied whereby the operator will know when to discontinue the application of the bead wire which, in the present case, is after three rings. After the proper number of convolutions of wire have been applied, drum 13 is stopped and crank 86 is operated so that counter wheel 73 will disengage from roller 72. The process has now progressed to the stage illustrated in Figure 14.

The next operation consists in the application of the rubber filler strip. This is accomplished by swinging lever 93 off of rest 108 onto the bead wire on drum 13 as shown in Figures 6 and 7. Drum 13 is again slowly rotated counter-clockwise and pressure is applied on handle 94 to stick the strip to the bead wire. When a complete convolution of the filler strip has been applied, the drum 13 is stopped, the applying device returned to rest 108 and the strip cut and the ends of the convolution are butted on the bead wire. The condition of the work at the completion of this operation is as illustrated in Figure 15.

Figure 16:
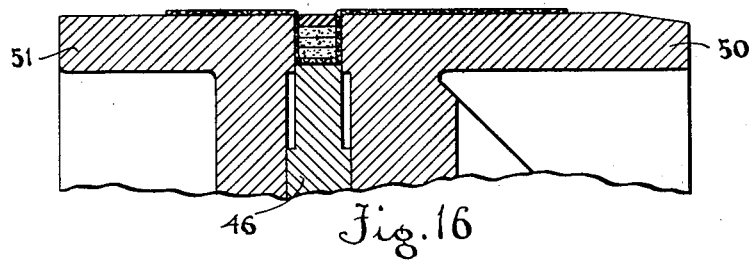

The succeeding operation consists in turning the covering and flipper fabric outwardly about the bead wire and filler. This is accomplished by first rapidly rotating drum 13 clockwise by means of roller 21 and operating lever 58 to urge collar 55 forwardly from the position shown in Figure 2 whereby toggles 54 will expand segments 50 and 51. Centrifugal force, due to the rapid rotation of the drum 13, greatly assists the expansion of segments 50 and 51 so that comparatively slight pressure is required on lever 58. When this operation is complete, the drum 13 is stopped and the work is in the condition shown in Figure 16.

Figure 17:
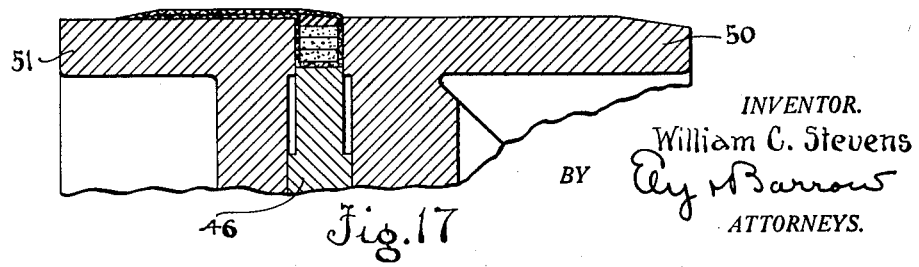

The final operation of forming the bead is accomplished by rapidly rotating the expanded drum clockwise and by comparatively slowly moving stitcher 109 transversely of the drum by means of handle 112 (Figure 4). As shown in Figure 11, the blade 109 first engages under the rear edge of the flipper fabric and passes forwardly thereunder, separating it from the drum. When the stitcher blade 109 engages the rear edge of the bead material in the groove of the drum 13, the rear portion of the flipper fabric on segments 51 is caused suddenly to swing about the rear corner of the bead over the bead wires and onto the forward portion of the flipper on segments 50. Continued rotation of drum 13 and forward transverse feeding of blade 109 stitches the rear portion of the flipper fabric in place over the bead wires and onto the forward portion of the flipper fabric to provide the bead flipper. This operation is illustrated in Figure 12. It will be noted that blade 109 will yield sufficiently to pass over the bead without destroying the covering and flipper fabric. The completed bead on the drum 13 is illustrated in Figure 17.

Removal of the bead from drum 13 is effected by operating lever 58 to collapse segments 50 and 51 whereupon the bead is slipped forwardly axially over segments 50. A portion of completed bead when removed from the drum is illustrated in Figure 18. It will be noted that the flipper will have contracted inwardly at its forward edge, due to the tendency of the fabric to return to its original non-stretched condition.

It will appear from the foregoing that applicant has devised an exceedingly simple and effective device for rapidly turning out tire beads for use in pneumatic tire casings. It will also appear that an effective and practical method of building beads has been devised which include the steps of forming a transversely flat band of fabric, applying convolutions of core forming material including the wire and filler to the band intermediate of its edges, stretching the band outwardly about the core to cover the sides thereof, and turning one side of the band over the bead and stitching it in place onto the band on the other side of the bead to complete covering the core and to form the flip. Modifications of the invention may be resorted to without departing from the spirit thereof or the scope of the appended claims.

What is claimed is:

1. A method for building beads comprising, forming a transversely flat band of fabric, applying convolutions of material, including wire and rubber filler, to the band intermediate its edges to form a core, expanding the fabric outwardly of the core to cover the sides thereof, and turning one side of the expanded band over the core to completely cover the core and stitching it onto the other side of the band to form a flip on the bead.

2. The method of making beads comprising, forming a band of fabric on a drum by slowly rotating the drum and progressively applying a strip of fabric thereto, applying convolutions of core forming material to the drum in a similar manner, and finally stitching the fabric over the core by rapidly rotating the drum and moving a stitching tool transversely over the surface of the drum.

3. The method of making beads comprising, applying a band of fabric on a drum, applying a core on the drum and stitching the fabric about the core by rapidly rotating the drum and moving a stitcher tool transversely over the surface of the drum.

4. The method of making beads comprising applying a band of fabric on a normally flat drum adapted to be expanded so as to provide a peripheral groove, applying a core on the drum so that it will lie in the groove in said expanded drum, rapidly rotating the drum, and inserting a tool under one edge of the fabric and moving it transversely of the drum and across the groove while it is rapidly rotating to stitch the fabric about the core.

WILLIAM C. STEVENS.